United States Patent
Liu et al.

(10) Patent No.: US 6,797,396 B1
(45) Date of Patent: Sep. 28, 2004

(54) WRINKLE RESISTANT INFRARED REFLECTING FILM AND NON-PLANAR LAMINATE ARTICLES MADE THEREFROM

(75) Inventors: Yaoqi J. Liu, Maplewood, MN (US); Jeffrey A. Boettcher, Falcon Heights, MN (US); Heather K. Kranz, Blaine, MN (US); Andrew T. Ruff, Mendota Heights, MN (US); Brian L. Koster, Mendota Heights, MN (US); David K. Mortenson, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/590,924

(22) Filed: Jun. 9, 2000

(51) Int. Cl.$^7$ .................. B32B 27/08; B32B 27/16; B32B 27/30; B32B 27/36

(52) U.S. Cl. .................. 428/483; 428/426; 428/430; 428/441; 428/480; 428/910; 359/359; 359/487; 359/494; 359/577; 359/580; 359/584; 359/586; 359/589; 359/601

(58) Field of Search ............... 428/426, 430, 428/441, 480, 483, 910; 359/359, 487, 494, 577, 580, 584, 586, 589, 601

(56) References Cited

U.S. PATENT DOCUMENTS

| | | | |
|---|---|---|---|
| 3,187,075 A | * 6/1965 | Seifried et al. | 264/290.2 |
| 3,874,966 A | 4/1975 | Garcia | 156/85 |
| 4,020,141 A | * 4/1977 | Quinn et al. | 264/212 |
| 4,465,736 A | * 8/1984 | Nishihara et al. | 156/106 |
| 4,814,426 A | * 3/1989 | Utsumi et al. | 264/176.1 |
| 4,963,418 A | * 10/1990 | Isaka et al. | 156/218 |
| 4,973,364 A | * 11/1990 | Farrar et al. | 156/84 |
| 4,985,538 A | * 1/1991 | Fukuda et al. | 528/305 |
| 4,996,291 A | * 2/1991 | Yoshinaka et al. | 264/210.7 |
| 5,024,895 A | * 6/1991 | Kavanagh et al. | 428/437 |
| 5,085,141 A | 2/1992 | Triffaux | 100/155 |
| 5,095,210 A | * 3/1992 | Wheatley et al. | 250/339.05 |
| 5,149,578 A | * 9/1992 | Wheatley et al. | 206/807 |
| 5,294,272 A | * 3/1994 | Peterson et al. | 156/85 |
| RE34,605 E | 5/1994 | Schrenk et al. | 359/359 |
| 5,320,893 A | * 6/1994 | Floyd | 428/136 |
| 5,360,659 A | * 11/1994 | Arends et al. | 359/359 |
| 5,529,654 A | * 6/1996 | Kavanagh et al. | 156/229 |
| 5,773,102 A | 6/1998 | Rehfeld | 428/34 |
| 5,882,774 A | 3/1999 | Jonza et al. | 428/212 |
| 5,980,666 A | 11/1999 | Roth et al. | 156/107 |
| 6,045,894 A | 4/2000 | Jonza et al. | 428/212 |
| 6,049,419 A | * 4/2000 | Wheatley et al. | 359/359 |
| 6,157,490 A | 12/2000 | Wheatley et al. | 359/589 |
| 6,207,260 B1 | 3/2001 | Wheatley et al. | 428/212 |
| 6,259,541 B1 | * 7/2001 | Town | 359/1 |
| 6,268,961 B1 | 7/2001 | Nevitt et al. | 359/488 |

FOREIGN PATENT DOCUMENTS

| | | |
|---|---|---|
| AU | 70850 | 4/1997 |
| CA | 2128462 | 1/1995 |
| DE | 197 45 647 | 4/1999 |
| EP | 0482590 | 4/1992 |
| EP | 0893248 | 1/1999 |
| EP | 0724955 | 8/2000 |
| GB | 2008480 | 6/1979 |
| JP | 06321589 | 11/1994 |
| JP | 10337800 | 12/1998 |

(List continued on next page.)

*Primary Examiner*—Vivian Chen
(74) *Attorney, Agent, or Firm*—Harold C. Knecht, III

(57) ABSTRACT

A birefringent dielectric multilayer film that reflects in a wavelength region of interest, and preferably reflects at least 50% of light in a band at least 100 nm wide, preferably positioned between wavelengths from about 700 nm to about 2000 nm. The film is heat set to render the film capable of shrinking to conform without substantial wrinkling to a substrate having a compound curvature. The film may be laminated to form a wide variety of non-planar articles.

43 Claims, 3 Drawing Sheets

FOREIGN PATENT DOCUMENTS

| | | |
|---|---|---|
| WO | WO97/01440 | 1/1997 |
| WO | WO97/01778 | 1/1997 |
| WO | WO97/10099 | 3/1997 |
| WO | WO98/26929 | 12/1997 |
| WO | WO98/26927 | 6/1998 |
| WO | WO99/19267 | 4/1999 |
| WO | WO99/36248 | 7/1999 |
| WO | WO99/36258 | 7/1999 |
| WO | WO99/36262 | 7/1999 |
| WO | WO99/39224 | 8/1999 |
| WO | WO00/07046 | 2/2000 |
| WO | WO01/38907 | 5/2001 |
| WO | WO01/58989 | 8/2001 |
| WO | WO01/96115 | 12/2001 |

* cited by examiner

WRINKLE RESISTANT INFRARED REFLECTING FILM AND NON-PLANAR LAMINATE ARTICLES MADE THEREFROM

TECHNICAL FIELD

This invention relates to birefringent dielectric multilayer reflecting films and laminate articles made therefrom.

BACKGROUND

A conventional automotive safety glazing is formed from a laminate made of two rigid layers, typically glass, and an anti-lacerative mechanical energy absorbing interlayer of plasticized polyvinyl butyral (PVB). The glazing is prepared by placing the PVB layer between glass sheets, eliminating air from the engaging surfaces, and then subjecting the assembly to elevated temperature and pressure in an autoclave to fusion bond the PVB and glass into an optically clear structure. The glazing may then be used in the windows, windshields or rear glass of a motor vehicle.

The laminate may also include at least one functional layer engineered to enhance the performance of the vehicle window. One important functional layer reduces entry of infrared radiation into the vehicle cabin. Infrared rejecting functional layers are typically made of metallized or dyed polymer film constructions that reflect or absorb unwanted solar radiation. When used in a windshield, the composite laminate structure should transmit at least about 70% of the light in the wavelength region sensitive to the human eye, typically from about 380 to about 700 nanometers (nm), and reject solar radiation outside the visible portion of the spectrum. When used in other glazing structures, such a side or rear windows, there are typically no limits on the level of visible transmission.

Referring to FIG. 1A, a pre-laminate structure 10 is shown that may be bonded to one or more glass sheets to make a vehicular safety glazing laminate. The pre-laminate 10 includes a reflective functional layer 12 that includes a polymer layer 14 and a metallized layer 16. The functional layer 12 is bonded on at least one side to at least one layer 18 of PVB. Optionally, the functional layer 12 may be bonded to a second layer 20 of PVB. One or the other or both of the PVB layers 18, 20 may include additional performance enhancing layers. For example, the PVB layer 20 may optionally include a shade band layer 22.

Referring to FIG. 1B, the pre-laminate structure 10 may be matched with at least one, preferably two, sheets of glass 30, 32 to form a safety glazing laminate 34. To bond the pre-laminate 10 to the glass sheets 30, 32, the pre-laminate 10 and the sheets 30, 32 are placed together. The laminate 34 is heated to cause the PVB layers 18, 20 and the functional layer 12 to conform to the contours of the glass sheets 30, 32. The laminate 34 may be assembled by one of three different methods. Two of the methods use a vacuum de-airing process where a flexible band, ring or bag is placed around the edge of the laminate and connected to a vacuum system while the laminate is pre-heated to generate a temporary bonding between the glass and PVB. Another method uses a pressure roller device, referred to herein as a nip roller, which applies pressure to the laminate to de-air and to promote bonding between the layers. Compared to the vacuum de-airing processes, the nip roll process requires fewer manual process steps and allows the laminates to be assembled more quickly. For at least these reasons, the nip roll process is a preferred method for many automotive glazing manufacturers.

To enhance vehicle aerodynamics and improve outward visibility, vehicular window shapes are not planar, and increasingly include severe angles and complex curves. When the laminate 10 is placed between complex curved glass sheets and laminated with a nip roll process, or heated to bond the PVB to the glass. The functional layer 12 cannot perfectly conform to the complex curvatures, especially when the glass sheets are large. Wrinkles, folds and pleats can form in the functional layer, and, when the functional layer is metallized, cracks can form in the metallized layer 16 during nip rolling, which creates an optical defect in the safety glazing. As a result, only small size laminates with no curvature or a small one-dimensional curvature can currently be manufactured using a nip roll process.

Birefringent, non-metallic films made from alternating layers of dielectric materials, preferably polymers with differing indices of refraction, may be engineered to reflect or absorb a desired amount of light in a spectral region of interest while transmitting sufficient visible light in the visible region of the spectrum to be substantially transparent. These birefringent dielectric optical films preferably include alternating layers of a first material having a first index of refraction and a second material having a second index of refraction that is different from the first index of refraction.

The film is preferably a multilayer stack of polymer layers with a Brewster angle (the angle at which reflectance of p polarized light goes to zero) that is very large or nonexistent. The film is made into a multilayer mirror whose reflectivity for p polarized light decreases slowly with angle of incidence, is independent of angle of incidence, or increases with angle of incidence away from the normal. This multi-layered film has high reflectivity (for both s and p polarized light) for any incident direction.

The reflectance characteristics of the multilayer film are determined by the in-plane indices of refraction for the layered structure. In particular, reflectivity depends upon the relationship between the indices of refraction of each material in the x, y, and z directions ($n_x$, $n_y$, $n_z$). The film of the invention is preferably constructed using at least one uniaxially birefringent material, in which two indices (typically along the x and y axes, or $n_x$ and $n_y$) are approximately equal, and different from the third index (typically along the z axis, or $n_z$). The x and y axes are defined as the in-plane axes, in that they represent the plane of a given layer within the multilayer film, and the respective indices $n_x$ and $n_y$ are referred to as the in-plane indices.

One method of creating a uniaxially birefringent system is to biaxially orient (stretch along two axes) the multilayer polymeric film. If the adjoining layers have different stress-induced birefringence, biaxial orientation of the multilayer film results in differences between refractive indices of adjoining layers for planes parallel to both axes, resulting in the reflection of light of both planes of polarization. A uniaxially birefringent material can have either positive or negative uniaxial birefringence. Positive uniaxial birefringence occurs when the index of refraction in the z direction ($n_z$) is greater than the in-plane indices ($n_x$ and $n_y$). Negative uniaxial birefringence occurs when the index of refraction in the z direction ($n_z$) is less than the in-plane indices ($n_x$ and $n_y$).

If $n_{1z}$ is selected to match $n_{2x}=n_{2y}=n_{2z}$ and the multilayer film is biaxially oriented, there is no Brewster's angle for p-polarized light and thus there is constant reflectivity for all angles of incidence. Multilayer films that are oriented in two mutually perpendicular in-plane axes are capable of reflecting an extraordinarily high percentage of incident light depending of the number of layers, f-ratio, indices of refraction, etc., and are highly efficient mirrors.

A second factor that determines the reflectance characteristics of the multilayer film is the thickness of the layers in the film stack. Adjacent pairs of layers (one having a high index of refraction, and the other a low index) preferably have a total optical thickness that is ½ of the wavelength of the light to be reflected. For a two-component system, to achieve maximum reflectivity the individual layers of a multilayer polymeric film have an optical thickness that is ¼ of the wavelength of the light to be reflected, although other ratios of the optical thicknesses within the layer pairs may be chosen for other reasons. Optical thickness is defined as the in-plane refractive index of a material multiplied by the actual thickness of the material, and all actual thicknesses discussed herein are measured after any orientation or other processing.

For example, by selecting the layer thicknesses to reflect near infrared light, and positioning the reflective bandedge within the infrared region such that even at grazing angles of incidence the reflectance band does not shift into the visible region of the spectrum, an infrared mirror can be made that is transparent in the visible region of the spectrum, even at high angles of incidence. The infrared (IR) reflecting films described in U.S. Pat. Nos. 5,882,774 and 6,049,419, each incorporated herein by reference, control the amount of solar energy that pass through them, preferably without significantly decreasing the intensity or changing the color of light sensed by the human eye at any angle. The materials in the layers, the thicknesses of the layers, and the indices of refraction of the layers are selected to reflect infrared radiation within the wavelength range of about 700 nm to about 2000 nm, while transmitting visible light. The film has an average reflectivity of at least 50% over a band at least 100 nm wide in the infrared region of the spectrum. These films have been applied to substantially flat substrates to form laminates. However, when applied to a non-planar substrate, wrinkles form in the film, so the films have not been used in laminates with severely curved or compound curved substrates. The wrinkles are a particular problem in laminates that should be substantially optically clear, such as, for example, laminates intended for use in vehicular windshields.

SUMMARY

In a first aspect, the invention is a process for making a film. The process includes providing a birefringent dielectric multilayer film that reflects at least 50% of light in a band at least 100 nm wide in a wavelength region of interest. The film is heat set to render the film capable of shrinking to conform without substantial wrinkling to a substrate having a compound curvature. Preferably, the wavelength region of interest is from about 700 nm to about 2000 nm.

In a second aspect, the invention is a process for making a film. The process includes providing a birefringent dielectric multilayer film that reflects at least 50% of light in a band at least 100 nm wide in a wavelength region of interest. The film is heat set at a temperature sufficient to enable the film to shrink at least about 0.4% in both in-plane directions upon heating. Preferably, the wavelength region of interest is from about 700 nm to about 2000 nm.

In a third aspect, the invention is a birefringent dielectric multilayer film that reflects at least 50% of light in a band at least 100 nm wide in a wavelength region of interest. The film is heat set at a temperature sufficient to render the film capable of shrinking to conform without substantial wrinkling to a substrate having a compound curvature. Preferably, the wavelength region of interest is from about 700 nm to about 2000 nm.

In a fourth aspect, the invention is a birefringent dielectric multilayer film that reflects at least 50% of light in a band at least 100 nm wide in a wavelength region of interest. The film is heat set at a temperature sufficient to enable the film to shrink at least about 0.4% in both in-plane directions upon heating. Preferably, the wavelength region of interest is from about 700 nm to about 2000 nm.

In a fifth aspect, the invention is a process for making a laminate article. The process includes assembling a laminate with the following layers: a first non-planar layer of a glazing material such as glass, a first energy absorbing layer, a film layer, a second energy absorbing layer and a second non-planar layer of glazing material. The film layer is a birefringent dielectric multilayer film that reflects at least 50% of light in a band at least 100 nm wide in a wavelength region of interest. The laminate is heated to remove residual air between the layers, and bond the layers such that the energy absorbing layers and the film layer conform to the shape of the non-planar glazing layers. The laminate is further heated and pressure is applied to the laminate to bond the layers together and form an optical structure, and the structure is cooled, wherein the structure exhibits substantially no wrinkling in the film layer. Preferably, the wavelength region of interest is from about 700 nm to about 2000 nm.

In a sixth aspect, the invention is a process for nip roll laminating a glazing article, including assembling a laminate with the following layers: a first non-planar layer of a glazing material, a first energy absorbing layer, a non-metallized film layer, a second energy absorbing layer and a second non-planar layer of a glazing material. The film layer reflects at least 50% of light in a band at least 100 nm wide in a wavelength region from about 700 to about 2000 nm. The laminate is heated to remove residual air between the layers, and the layers are bonded with a nip roller. The energy absorbing layers and the film layer conform to the shape of the non-planar glass layers without substantial cracking and or creasing.

In a seventh aspect, the invention is a pre-laminate including at least one layer of an energy absorbing material and a layer of a film. The film layer is a birefringent dielectric multilayer film that reflects light at least 50% in a band at least 100 nm wide over a wavelength region of interest. The film is heat set at a temperature sufficient to render the film capable of shrinking to conform without substantial wrinkling to a substrate with a compound curvature. Preferably, the wavelength region of interest is from about 700 nm to about 2000 nm.

In an eighth aspect, the invention is an optically clear laminate article including the following layers: a first non-planar layer of glass, a first energy absorbing layer of PVB, a film layer, a second energy absorbing layer of PVB and a second non-planar layer of glass. The film layer is a birefringent dielectric multilayer film that reflects that reflects at least 50% of light in a band at least 100 nm wide positioned between wavelengths from about 700 nm to about 2000 nm. Preferably, the laminate article is a windshield.

In a ninth aspect, the invention is a vehicle with a glass article. The article is an optically clear laminate including the following layers: a first non-planar layer of glass, a first energy absorbing layer of PVB, a film layer, a second energy absorbing layer of PVB and a second non-planar layer of glass. The film layer is a birefringent dielectric multilayer film that reflects that reflects at least 50% of light in a band at least 100 nm wide positioned between wavelengths from about 700 nm to about 2000 nm.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
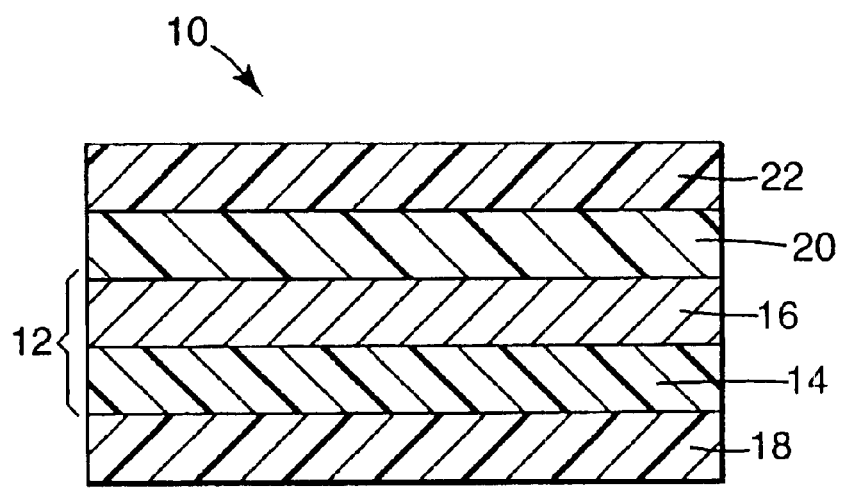
FIG. 1A is a cross-sectional view of a pre-laminate structure that may be bonded to one or more glass sheets to make a vehicular safety glazing laminate.
Figure 1B:
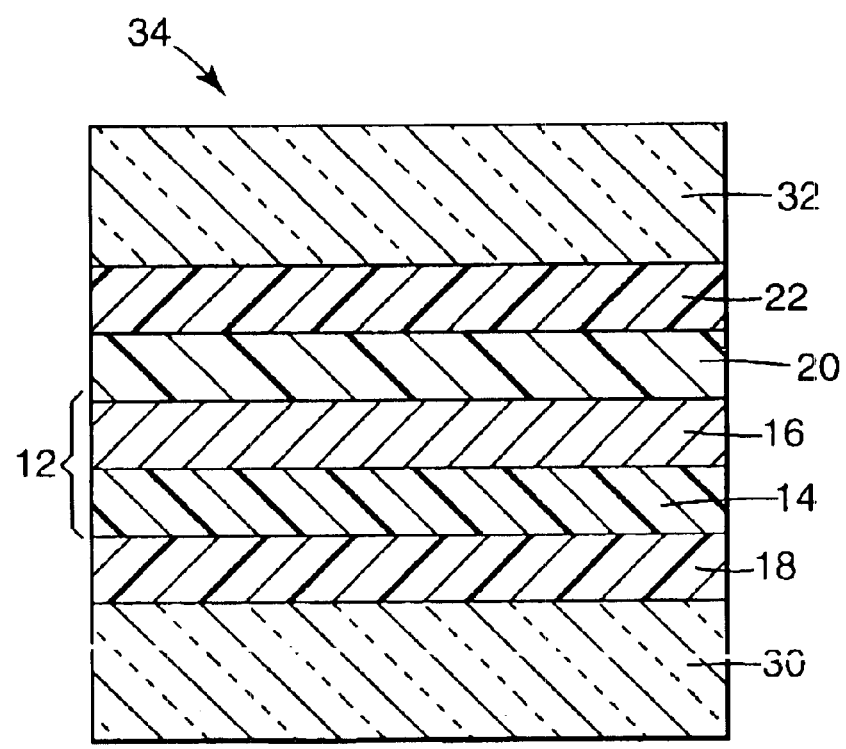
FIG. 1B is a cross-sectional view of a safety glazing laminate for a vehicle.

The film of the invention is a birefringent multilayer dielectric optical film with alternating layers of a first material with a first in plane index of refraction and a second material with a second in plane index of refraction that is different from the first index of refraction. This film is highly reflective for both s and p polarized light for any incident direction, and has an average reflectivity of at least 50%, preferably 70%, and more preferably 90%, over at least a 100 nm wide band in a wavelength region of interest. The wavelength region of interest may vary widely depending on the intended application. In one embodiment, the wavelength region of interest is the infrared region, and the film is engineered to reflect incident radiation in the infrared region. The IR reflecting film (also referred to herein as a solar rejection film) includes polymeric layers with optical thicknesses (by selecting the actual layer thicknesses and materials) sufficient to reflect light in the near infrared portion of the spectrum, within the range of about 700 nm to about 2000 nm.

In one embodiment, the solar rejection film is a two component narrow-band IR reflecting film designed to eliminate visible color due to higher order reflections that occur in the visible region of the spectrum from first order reflecting bands that occur in the IR region above about 1200 nm. The bandwidth of light to be blocked by this film, i.e., not transmitted, at a zero degree observation angle is from approximately 700 to 1200 nm. Further, to reduce visible color at non-normal angles, the short wavelength bandedge is typically shifted by about 100 to 150 nm away from the long wavelength visible bandedge and further into the IR so that the reflecting band does not shift into the visible region of the spectrum at maximum use angles. This results in a narrow-band solar rejection film that reflects from about 850 nm to about 1200 nm at normal angles. For a quarter wave stack, the layer pairs of this film preferably have optical thicknesses ranging from 425 to 600 nm (½ the wavelength of the light desired to be reflected) to reflect the near infrared light. More preferably, for a quarter wave stack, the film has individual layers each having an optical thickness ranging from 212 to 300 nm (¼ the wavelength of the light desired to be reflected), to reflect the near infrared light.

To reflect over a wide band, the various layers in the film preferably have varying relative thicknesses, referred to herein as a layer thickness gradient, which are selected to achieve the desired bandwidth of reflection. In one embodiment, the layer thickness gradient may be linear, in which the thickness of the layer pairs increases at a constant rate across the thickness of the film, so that each layer pair is a certain percent thicker than the thickness of the previous layer pair. In another embodiment, the layer thickness may decrease, then increase, then decrease again from one major surface of the film to the other, or may have an alternate layer thickness distribution designed to increase the sharpness of one or both bandedges, as described in U.S. Pat. No. 6,157,490, which is incorporated herein by reference.

In another embodiment, the present invention includes an extended bandedge two component IR reflecting film construction having a six layer alternating repeating unit as described in U.S. Pat. No. 5,360,659, incorporated herein by reference. This construction suppresses the unwanted second, third, and fourth order reflections in the visible wavelength region of between about 380 to about 700 nm, while reflecting light in the infrared wavelength region of between about 700 to about 2000 nm. Reflections higher than fourth order will generally be in the ultraviolet, not visible, region of the spectrum or will be of such a low intensity as to be unobjectionable. The film comprises alternating layers of first (A) and second (B) polymeric materials in which the six layer alternating repeat unit has relative optical thicknesses of about 0.778A.111B.111A.778B111A.111B. The use of only six layers in the repeat unit results in more efficient use of material and is relatively easy to manufacture. In this construction, it is again desirable to introduce a repeat unit thickness gradient across the thickness of the film.

In yet another embodiment, the two component film may comprise a first portion of alternating layers comprising the six layer alternating layer repeating unit which reflects infrared light of wave lengths between about 1200–2000 nm and a second portion of alternating layers having an AB repeat unit and substantially equal optical thicknesses which reflect infrared light of wavelengths between about 700–1200 nm. Such a combination of alternating layers is called a hybrid design and results in reflection of light across the infrared wavelength region. The layer thicknesses of both portions of alternating layers can be adjusted to place the reflecting band within the infrared spectrum so as to minimize any perceived color change with angle.

The multilayer optical films may also include more than two distinguishable polymers. A third or subsequent polymer might be fruitfully employed as an adhesion-promoting layer between the first polymer and the second polymer within an optical stack, as an additional component in a stack for optical purposes, as a protective boundary layer between optical stacks, as a skin layer, as a functional coating, or for any other purpose. As such, the composition of a third or subsequent polymer, if any, is not limited.

In an alternate embodiment, IR reflecting films including more than two distinguishable polymers can be made. This extends the reflecting band further into the IR to increase the amount of IR reflection while minimizing color in the visible region of the spectrum, which results from reflection due to higher order harmonics. Examples of such films include those described in U.S. Pat. No. RE 34,605, incorporated herein by reference. The RE '605 patent describes a multi-layer optical interference film including three diverse substantially transparent polymeric materials, A, B, and C and having a repeating unit of ABCB. The layers have an optical thickness of between about 90 nm to about 450 nm, and each of the polymeric materials bas a different index of refraction, $n_i$.

To produce a film that reflects a broad bandwidth of wavelengths in the solar infrared range (e.g., reflection at from about 700 to about 2000 nm), a layer thickness gradient is introduced across the thickness of the film, and the layer thicknesses preferably increase monotonically across the thickness of the film. Preferably, for a three component system, the first polymeric material (A) differs in refractive index from the second polymeric material (B) by at least about 0.03, the second polymeric material (B) differs in refractive index from the third polymeric material (C) by at least about 0.03, and the refractive index of the second polymeric material (B) is intermediate the respective refractive indices of the first (A) and third (C) polymeric materials. Any or all of the polymeric materials may be synthesized to have the desired index of refraction by utilizing a copolymer or miscible blend of polymers.

Another useful film design is described in U.S. Pat. No. 6,207,260, which is incorporated herein by reference. Optical films and other optical bodies are described which exhibit a first order reflection band for at least one polarization of electromagnetic radiation in a first region of the spectrum while suppressing at least the second, and preferably also at least the third, higher order harmonics of the first reflection band, while the percent reflection of the first order harmonic remains essentially constant, or increases, as a function of angle of incidence.

This is accomplished by forming at least a portion of the optical body out of polymeric materials A, B, and C which are arranged in a repeating sequence ABC, wherein A has refractive indices $n_x^A$, $n_y^A$, and $n_z^A$ along mutually orthogonal axes x, y, and z, respectively, B has refractive indices $n_x^B$, $n_y^B$, and $n_z^B$ along axes x, y and z, respectively, and C has refractive indices $n_x^C$, $n_y^C$ and $n_z^C$ along axes x, y, and z, respectively, where axis z is orthogonal to the plane of the film or optical body, wherein $n_x^A > n_x^B > n_x^C$ or $n_y^A > n_y^B > n_y^C$, and wherein $n_z^C \geq n_z^B \geq n_z^A$. Preferably, at least one of the differences $n_z^A - n_z^B$ and $n_z^B - n_z^C$ is less than or equal to about −0.05.

By designing the film or optical body within these constraints, at least some combination of second, third and fourth higher-order reflections can be suppressed without a substantial decrease of the first harmonic reflection with angle of incidence, particularly when the first order reflection band is in the infrared region of the spectrum.

In an alternate embodiment, the infrared reflecting film of the present invention may comprise a first portion of alternating layers comprising a multicomponent optical design that reflects infrared light of wavelengths between about 1200–2000 nm while minimizing higher order reflections that contribute to visible color, and a second portion of alternating layers having an AB repeat unit and substantially equal optical thicknesses which reflect infrared light of wavelengths between about 700–1200 nm. This hybrid design may be provided as described, for example, in U.S. Pat. No. 5,360,659, but has broader application in that it is useful with any of the multicomponent optical designs described herein. The layer thicknesses of both portions of alternating layers can be adjusted to place the reflecting band within the infrared spectrum to minimize any perceived color change with angle.

In yet another alternate embodiment, any of the above described IR rejection films can be combined with a "gap-filler" component that increases the optical efficiency of the film when the reflecting band is selectively positioned away from the visible region of the spectrum to minimize perceived color change with angle. Such a component works at normal angles to absorb or reflect IR radiation in the region between the edge of the visible spectrum and the short wavelength bandedge of the IR reflecting band. This film is described more fully in U.S. Ser. No. 09/005,727, which is incorporated herein by reference.

Material Selection

Another factor that determines the reflectance characteristics of the film of the invention is the materials selected for the layers in the stack. Many different materials may be used, and the exact choice of materials for a given application depends on the desired match and mismatch obtainable in the refractive indices between the various optical layers along a particular axis, as well on as the desired physical properties in the resulting product. For simplicity, the films will be described further considering an optical stack made from only two materials, referred to herein as the first polymer and the second polymer.

At least one of the two polymers in the stack, referred to herein as the first polymer, has a stress optical coefficient with a large absolute value. The first polymer must be capable of developing a large birefringence when stretched. Depending on the application, the birefringence may be developed between two orthogonal directions in the plane of the film, between one or more in-plane directions and the direction perpendicular to the film plane, or a combination of these. The first polymer should maintain birefringence after stretching, so that the desired optical properties are imparted to the finished film.

To make a reflective, or mirror, film, refractive index criteria apply equally to any direction in the film plane, so it is typical for the indices for any given layer in orthogonal in-plane directions to be equal or nearly so. It is advantageous, however, for the film-plane of the first polymer to differ as greatly as possible from the film-plane indices of the second polymer. For this reason, if the first polymer has an index of refraction higher than that of the second polymer before orientation, it is advantageous that the in plane indices of refraction increase in the direction of stretch, and the z index decreases to match that of the second polymer. Likewise, if the first polymer has an index of refraction lower than that of the second polymer before orientation, it is advantageous that the in plane indices of refraction decrease in the direction of stretch, and the z index increases to match that of the second polymer. The second polymer advantageously develops little or no birefringence when stretched, or develops birefringence of the opposite sense (positive-negative or negative-positive), such that its film-plane refractive indices differ as much as possible from those of the first polymer in the finished film. These criteria may be combined appropriately with those listed above for polarizing films if a mirror film is meant to have some degree of polarizing properties as well.

For most applications, it is advantageous for neither the first polymer nor the second polymer to have any absorbance bands within the bandwidth of interest for the film in question. Thus, all incident light within the bandwidth is either reflected or transmitted. However, for some applications, it may be useful for one or both of the first and second polymers to absorb specific wavelengths, either totally or in part.

The first and second optical layers and the optional non-optical layers of the solar rejection film of the present invention are typically composed of polymers such as, for example, polyesters. The term "polymer" will be understood to include homopolymers and copolymers, as well as polymers or copolymers that may be formed in a miscible blend, for example, by coextrusion or by reaction, including, for example, transesterification. In general, the use of comonomers should not substantially impair the stress optical coefficient or retention of birefringence after stretching. In practice, these restrictions impose an upper limit on the comonomer content, the exact value of which will vary with the choice of comonomer(s) employed. Some compromise in optical properties may be accepted, however, if comonomer incorporation results in improvement of other properties. The terms "polymer", "copolymer", and "copolyester" include both random and block copolymers Polyesters for use in the multilayer reflective mirrors and polarizers of the present invention generally include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. Also included within the term "polyester" are polycarbonates derived from the reaction of glycol monomer molecules with esters of carbonic acid.

Suitable carboxylate monomer molecules for use in forming the carboxylate subunits of the polyester layers include, for example, 2,6-naphthalene dicarboxylic acid and isomers thereof; terephthalic acid; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid, trimellitic acid, sodium sulfonated isophthalic acid; 2,2'-biphenyl dicarboxylic acid and isomers thereof; and lower alkyl esters of these acids, such as methyl or ethyl esters. The term "lower alkyl" refers, in this context, to C1–C10 straight-chained or branched alkyl groups.

Suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis (2-hydroxyethoxy)benzene.

A polyester useful in the solar rejection films of the present invention is polyethylene naphthalate (PEN), which can be made, for example, by reaction of naphthalene dicarboxylic acid with ethylene glycol. Polyethylene 2,6-naphthalate (PEN) is frequently chosen as a first polymer. PEN has a large positive stress optical coefficient, retains birefringence effectively after stretching, and has little or no absorbance within the visible range. PEN also has a large index of refraction in the isotropic state. Its refractive index for polarized incident light of 550 nm wavelength increases when the plane of polarization is parallel to the stretch direction from about 1.64 to as high as about 1.9. Increasing molecular orientation increases the birefringence of PEN. The molecular orientation may be increased by stretching the material to greater stretch ratios and holding other stretching conditions fixed. Other semicrystalline naphthalene dicarboxylic polyesters suitable as first polymers include, for example, polybutylene 2,6-Naphthnalate (PBN), polyethylene terephthalate (PEI), and copolymers thereof. Non-polyester polymers are also useful in creating polarizer films. For example, polyether imides can be used with polyesters, such as PEN and coPEN, to generate a multilayer reflective mirror. Other polyester/non-polyester combinations, such as polyethylene terephthalate and polyethylene (e.g., those available under the trade designation Engage 8200 from Dow Chemical Corp., Midland, Mich.), can be used. Suitable first polymers are described, for example, in Published PCT Application Nos. WO 99/36248, WO 99/36262 and WO 01/38907, and in U.S. Pat. No. 6,268,961, which are incorporated herein by reference.

A preferred first polymer is a coPEN derived with carboxylate subunits derived from 90 mol % dimethyl naphthalene dicarboxylate and 10 mol % dimethyl terephthalate and glycol subunits derived from 100 mol % ethylene glycol subunits and an intrinsic viscosity (IV) of 0.48 dL/g. The index of refraction is approximately 1.63. The polymer is herein referred to as low melt PEN (90/10). Another preferred first polymer is a PET having an inherent viscosity of 0.74 dL/g, available from Eastman Chemical Company (Kingsport, Tenn.).

The other required polymer, referred to herein as the second polymer, should be chosen so that in the finished film, the refractive index, in at least one direction, differs significantly from the index of refraction of the first polymer in the same direction. Because polymeric materials are typically dispersive, that is, the refractive indices vary with wavelength, these conditions must be considered in terms of a particular spectral bandwidth of interest. It will be understood from the foregoing discussion that the choice of a second polymer is dependent not only on the intended application of the multilayer optical film in question, but also on the choice made for the first polymer, as well as processing conditions.

The second optical layers can be made from a variety of second polymers having glass transition temperature compatible with that of the first polymer and having a refractive index similar to the isotropic refractive index of the first polymer. Examples of suitable polymers include vinyl polymers and copolymers made from monomers such as vinyl naphthalenes, styrene, maleic anhydride, acrylates, and methacrylates. Examples of such polymers include polyacrylates, polymethacrylates, such as poly (methyl methacrylate) (PMMA), and isotactic or syndiotactic polystyrene. Other polymers include condensation polymers such as polysulfones, polyamides, polyurethanes, polyamic acids, and polyimides. In addition, the second optical layers can be formed from polymers and copolymers such as polyesters and polycarbonates.

Preferred second polymers are homopolymers of polymethylmethacrylate (PMMA), such as those available from Ineos Acrylics, Inc., Wilmington, Del., under the trade designations CP71 and CP80, or polyethyl methacrylate (PEMA), which bas a lower glass transition temperature than PMMA. Additional preferred second polymers include copolymers of PMMA (coPMMA), such as a coPMMA made from 75 wt % methylmethacrylate (MMA) monomers and 25 wt % ethyl acrylate (EA) monomers, (available from Ineos Acrylics, Inc., under the trade designation PERSPEX™ CP63), a coPMMA formed with MMA comonomer units and n-butyl methacrylate (nBMA) comonomer units, or a blend of PMMA and poly (vinylidene fluoride) (PVDF) such as that available from Solvay Polymer, Inc., Houston, Tex. under the trade designation SOLEF™ 1008. Yet other preferred second polymers include polyolefin copolymers such as poly (ethylene-co-octene) (PE-PO) available from Dow-Dupont Elastomers under the trade designation ENGAGE™ 8200, poly (propylene-co-ethylene) (PPPE) available from Fina Oil and Chemical Co., Dallas, Tex. under the trade designation Z9470, and a copolymer of atatctic polypropylene (aPP) and isotatctic polypropylene (iPP) available from Huntsman Chemical Corp., Salt Lake City, Utah, under the trade designation REFLEX™ W111. Second optical layers can also be made from a functionalized polyolefin, such as linear low density polyethylene-g-maleic anhydride (LLDPE-g-MA) such as that available from E.I. duPont de Nemours & Co., Inc., Wilmington, Del., under the trade designation BYNEL™ 4105.

Particularly preferred combinations of first/second polymers for optical layers in IR reflective mirrors include PEN/PMMA, PET/PMA or PET/coPMMA, PEN/ECDEL™, PET/ECDEL™, PEN/sPS, PET/sPS, PEN/coPET, PEN/PETG, and PEW/THV™, ECDEL™ is a trade designation for a copolyester ether elastomer available from Eastman Chemical Company (Kingsport, Tenn.). THV™ is a trade designation for a fluoropolymer commercially available from Minnesota Mining and Manufacturing Company (3M), St. Paul, Minn. PMMA refers to polymethyl methacrylate, coPET refers to a copolymer or blend based upon terephthalic acid (as described above), and PETG refers to a copolymer of PET employing a second glycol (usually cyclohexanedimethanol). sPS refers to syndiotactic polystyrene.

For mirror films, a match of the refractive indices of the first polymer and second polymer in the direction normal to the film plane is preferred, because it provides constant reflectance with respect to the angle of incident light (that is, there is no Brewster's angle). For example, at a specific wavelength, the in-plane refractive indices might be 1.76 for biaxially oriented PEN, while the film plane-normal refractive index might fall to 1.49. When PMMA is used as the second polymer in the multilayer construction, its refractive index at the same wavelength, in all three directions, might be 1.495. Another example is the PET/ECDEL™ system, in which the analogous indices might be 1.66 and 1.51 for PET, while the isotropic index of ECDEL elastomer might be 1.52.

In addition to the first and second optical layers, the multilayer reflective film of the present invention optionally includes one or more non-optical layers such as, for example, one or more skin layers or one or more interior non-optical layers, such as, for example, protective boundary layers between packets of optical layers. Non-optical layers can be used to give the multilayer film structure or to protect it from harm or damage during or after processing. For some applications, it may be desirable to include sacrificial protective skins, wherein the interfacial adhesion between the skin layer(s) and the optical stack is controlled so that the skin layers can be stripped from the optical stack before use.

Materials may be chosen for the non-optical layers that impart or improve properties such as, for example, tear resistance, puncture resistance, toughness, weatherability, and solvent resistance of the multilayer optical body. Typically, one or more of the non-optical layers are placed so that at least a portion of the light to be transmitted, polarized, or reflected by the first and second optical layers also travels through these layers (i.e., these layers are placed in the path of light which travels through or is reflected by the first and second optical layers). The non-optical layers typically do not substantially affect the reflective properties of the optical films over the wavelength region of interest. Properties of the non-optical layers such as crystallinity and shrinkage characteristics need to be considered along with the properties of the optical layers to give the film of the present invention that does not crack or wrinkle when laminated to severely curved substrates.

The non-optical layers may be of any appropriate material and can be the same as one of the materials used in the optical stack. For example, factors to be considered in selecting a material for a non-optical layer include percent elongation to break, Young modulus, tear strength, adhesion to interior layers, percent transmittance and absorbance in an electromagnetic bandwidth of interest,: optical clarity or haze, refractive indices as a function of frequency, texture and roughness, melt thermal stability, molecular weight distribution, melt rheology and coextrudability, miscibility and rate of inter-diffusion between materials in the tough and optical layers, viscoelastic response, relaxation and crystallization behavior under draw conditions, thermal stability at use temperatures, weatherability, ability to adhere to coatings and permeability to various gases and solvents. Of course, as previously stated, it is important that the material chosen not have optical properties deleterious to those of the optical stack. The non-optical layers may be formed from a variety of polymers, such as polyesters, including any of the polymers used in the first and second optical layers. In some embodiments, the material selected for the non-optical layers is similar to or the same as the material selected for the second optical layers. The use of coPEN, coPET, or other copolymer material for skin layers reduces the splittiness (i.e., the breaking apart of a film due to strain-induced crystallinity and alignment of a majority of the polymer molecules in the direction of orientation) of the multilayer optical film. The coPEN of the non-optical layers typically orients very little when stretched under the conditions used to orient the first in optical layers, and so there is little strain-induced crystallinity.

Preferably, the polymers of the first optical layers, the second optical layers, and the optional non-optical layers are chosen to have similar rheological properties (e.g., melt viscosities) so that they can be co-extruded without flow disturbances. Typically, the second optical layers, skin layers, and optional other non-optical layers have a glass transition temperature, $T_g$, that is either below or no greater than about 40° C. above the glass transition temperature of the first optical layers. Preferably, the glass transition temperature of the second optical layers, skin layers, and optional non-optical layers is below the glass transition temperature of the first optical layers. When length orientation (LO) rollers are used to orient the multilayer optical film, it may not be possible to use desired low $T_g$ skin materials, because the low $T_g$ material will stick to the rollers. If LO rollers are not used, then this limitation is not an issue. For some applications, preferred skin layer materials include PMMA and polycarbonate because of their durability and their ability to protect the optical stack from UV radiation.

The skin layers and other optional non-optical layers can be thicker than, thinner than, or the same thickness as the first and second optical layers. The thickness of the skin layers and optional non-optical layers is generally at least four times, typically at least 10 times, and can be at least 100 times, the thickness of at least one of the individual first and second optical layers. The thickness of the non-optical layers can be varied to make a multilayer reflective film having a particular thickness.

A skin layer may be coextruded on one or both major surfaces of the multilayer stack during its manufacture to protect the multilayer stack from the high shear along the feedblock and die walls, and often an outer layer with the desired chemical or physical properties can be obtained by mixing an additive, such as, for example, a UV stabilizer, into the polymer melt that makes up the skin layer, and coextruding the skin layer with altered properties onto one or both sides of the multilayer optical stack during manufacture. Alternately, additional layers may be coextruded on the outside of the skin layers during manufacture of the multilayer film; they may be coated onto the multilayer film in a separate coating operation; or they may be laminated to the multilayer film as a separate film, foil, or rigid or semi-rigid reinforcing substrate.

Various functional layers or coatings can be added to the films and optical devices of the present invention to alter or improve their physical or chemical properties, particularly along the surface of the film or device. Such layers or coatings may include, for example, low friction coatings or slip particles to make the film easier to handle during the manufacturing process; particles to add diffusion properties to the multilayer optical film or to prevent wet-out or Newton's rings when the multilayer optical film is placed next to another film or surface; adhesives such as pressure sensitive adhesives and hot melt adhesives, adhesion promoters, primers and low adhesion backside materials for use when the film is to be used in adhesive roll form. The functional layers or coatings may also include shatter resistant, anti-intrusion, or puncture-tear resistant films and coatings, for example, the functional layers described in commonly assigned Published PCT Application No. WO 01/96115 entitled GLAZING ELEMENT AND LAMINATE FOR USE IN THE SAME, incorporated herein by reference. Additional functional layers or coatings may include vibration-damping film layers such as those described in WO 98/26927 and U.S. Pat. No. 5,773,102, barrier layers to provide protection or to alter the transmissive properties of the film or device towards liquids, such as water or organic solvents, or gases, such as oxygen, water vapor or carbon dioxide; and/or substrates and support layers designed to improve the mechanical integrity or strength of the film or device. These functional components may be incorporated into one or more skin layers, or they may be applied as a separate film or coating.

For some applications, it may be desirable to alter the appearance and/or performance of the multilayer optical film by coloring the film, such as by laminating a dyed film to the multilayer optical film, applying a pigmented coating to the surface of the film, or including a dye or pigment in one or more of the materials used to make the film, such as in the skin layer. The dye or pigment typically absorbs in one or more selected regions of the spectrum, including portions of the infrared, ultraviolet, and/or visible spectrum. The dye or pigment can be used to compliment the properties of the film, particularly where the film transmits some frequencies while reflecting others. A particularly useful pigmented layer that can be combined with the multilayer optical film of the present invention is described in Published PCT Application No. WO 01/58989, which is incorporated herein by reference. This film may be laminated, extrusion coated or coextruded as a skin layer on the multilayer film. The pigment loading level may be varied between about 0.01 and about 1.0% by weight to vary visible light transmission from about 10 to about 90%. In practice, the pigment loading level is selected such that when the pigmented film layer is combined with the multilayer optical film, the percent visible transmission is reduced to about 80–85% of the multilayer optical film's normal value, $T_{vis}$, to the legal limit of about 70–75% measured at an angle normal to a laminate construction. This improves the overall shading coefficient of the multilayer film construction.

The use of a UV absorptive material in a cover layer is also desirable because it may be used to protect the inner layers that may be unstable when exposed to UV radiation. The multilayer optical films can also be treated with, for example, inks, dyes, or pigments to alter their appearance or to customize the film for specific applications. Thus, for example, the films can be treated with inks or other printed indicia such as those used to display product identification, advertisements, warnings, decoration, or other information. Various techniques can be used to print on the film, such as, for example, screen printing, letterpress printing, offset printing, hexographic printing, stipple printing, laser printing, and so forth, and various types of ink can be used, including one and two component inks, oxidatively drying and UV-drying inks, dissolved inks, dispersed inks, and 100% ink systems.

For some applications, it may be desirable to have one or more anti-reflective layers or coatings that serve to increase transmission and to reduce reflective glare. Suitable layers or coatings can include, for example, conventional vacuum coated dielectric metal oxide or metal/metal oxide optical films, silica or zirconia sol gel coatings, and coated or coextruded anti-reflective layers such as those derived from low index fluoropolymers. When the solar rejection film of the present invention is laminated between sheets of a mechanical energy absorbing material such as PVB, the index of refraction of the skin layer can be selected to minimize reflection at the interface caused by the large difference in refractive indices between the PVB and multilayer optical stack materials. For example, the skin layer can be selected so that its index of refraction is the same as that of PVB, intermediate that of PVB and that of the high index first optical material, or intermediate that of PVB and the composite index of refraction of the optical stack. In some embodiments, protective boundary layers (PBLs) are used between the skin and optical stack, or between the optical stacks in the multiplied system. In these embodiments, the PBL material can be selected to minimize the reflection at the additional interfaces between the skin and PBL and between the PBL and optical stack. For example, the PBL can be selected so that its index of refraction is the same as the skin, intermediate between the skin and the composite index of the optical stack, or equal to that of the composite optical stack. Preferred skin and PBL layers to minimize the difference in refractive index between the PVB and the optical stack include CoPEN and CoPET.

Additional functional layers or coatings that may be added to the multilayer optical film include, for example, metal layers and other conductive layers. The metal layers may be made of, for example, gold, silver, aluminum, and nickel, as well as dispersions of these and other metals. In a vehicular windshield construction, the metal layers may be used for antennae, de-fogging and de-misting, defrosting or electromagnetic shielding. Other layers include antistatic coatings or films; flame retardants; UV stabilizers; abrasion resistant or hardcoat materials; optical coatings; antifogging materials, magnetic or magneto-optic coatings or films; liquid crystal panels, electrochromic or electroluminescent panels, photographic emulsions; prismatic films, and holographic films or images. Additional functional layers or coatings are described, for example, in WO 97/01440, WO 99/36262, and WO 99/36248, which are incorporated herein by reference. These functional components may be incorporated into one or more skin layers, or they may be applied as a separate film or coating. Or, the multilayer film itself may be modified by embossing, holographic images, corona, e-beam or plasma treatments.

The above IR rejecting multilayer optical films can be made according to U.S. Ser. No. 09/229,724, which is incorporated herein by reference. These films solve the problems of cracking that are typically seen when metallized solar rejection films are nip roll laminated to glazings having compound curvature. The films may wrinkle during nip roll lamination, however, especially when applied to large laminates and/or glazings with severe compound curvatures. In another aspect of the present inventions the process conditions can be controlled to produce a film with improved shrinkage properties, resulting in a film that does not wrinkle during the nip roll lamination process.

Process for Making Wrinkle-Free IR Film

Techniques for manufacturing polymeric multilayer films are described in detail in U.S. patent application Ser. No. 09/229,724, which is incorporated herein by reference. Following extrusion and layer formation, the film is cooled on a casting wheel to form a web. The web is then stretched longitudinally (along the web path, or in machine direction, MD) and transversely (across the web path, or in transverse direction, TD) sequentially in a length orienter (LO) and in a tenter. The stretch ratios are determined with reference to the optical and mechanical properties required for a particular application. In a typical LO, the web is preheated between temperature-controlled rollers to a temperature less than the Tg of the first polymer in the film construction. The web is then stretched in a stretch gap under IR lamps that heat the web to a temperature higher than the Tg of the first polymer. The LO oriented film is cooled over cold rollers and is then fed into a tenter.

A tenter typically has four zones, pre-heat, stretch, heatset and cooling zones. Each of these zones may have sub-zones. Length oriented film enters the tenter pre-heat zone and is clipped in chains on each edge of the film. The chains move at the speed of the film. The preheated film moves into the stretch zone where the chains diverge (controlled by rail positions) and is stretched in the transverse direction. The stretched film then passes through the heatset zones to impart additional crystallinity in the film and establish its shrinkage and other mechanical properties before exiting the tenter through a cooling zone. The fully oriented film is finally trimmed and wound on a winder.

If the non-planar substrate to which the film is to be laminated has a specific shape or curvature, to reduce wrinkling the shrinkage of the film may be individually controlled in each in-plane direction. If the curvatures along two principal axes of a region of the substrate are not equal to laminate the film to that region without wrinkles, the shrinkage of the film may be controlled such that it differs in each in-plane direction. The in-plane direction of the film with the greater shrinkage should be aligned with the dimension of the substrate having the greater curvature (i.e., a smaller radius of curvature).

For example, to achieve substantially wrinkle-free lamination to a non-planar, curved or compound curved substrate, for a PEN or PET based film the shrinkage is greater than about 0.4% in both in-plane directions, preferably greater than about 0.7% in at least one in-plane direction, and more preferably greater than about 1% in at least one in-plane direction. The shrinkage should be maintained at a minimum to reduce edge delamination. This phenomenon is called a "pull-in." So, the shrinkage is preferably less than about 3% in each in-plane direction, more preferably less than about 2.5% in each in-plane direction.

To introduce shrinkage into the film, for a similar residence time, the tenter heatset temperature is reduced, compared to the heatset temperature for a film intended for lamination to a planar substrate. However, this reduced heatset temperature may result in lower interlayer adhesion. The goal is to find process conditions that balance this trade-off and provide increased shrinkage in combination with acceptable interlayer adhesion.

To minimize shrinkage, it is desirable to select heatset conditions, such as, for example, temperature and/or residence time, that maximize crystal growth rate after the film is oriented. This temperature depends on the materials in the film and is typically between the glass transition temperature and melt temperature of the polymer in the film that has the highest Tg in the construction, typically the first polymer and/or the polymer making up the skin layers, referred to herein as the dominant polymer. As mentioned above, the skin layers can be the same polymer as the first polymer or can be a different polymer. However, the Tg of the skin layers is preferably either equal to or less than the Tg of the first polymer.

For example, typical heatset conditions for PEN based multilayer IR mirror films intended for lamination to a planar substrate are about 480° F. To control shrinkage and provide a film suitable for wrinkle-free lamination to a non-planar substrate, the heat set temperature for a PEN based multilayer IR mirror should be reduced to about 390° F. to about 400°F., preferably about 395° F., for about 10 seconds. The heat set temperature for a PET based multilayer IR mirror film suitable for lamination to a non-planar substrate should be about 440° F. to 470° F., preferably about 455° F. to about 465° F. for about 10 seconds.

In addition to the heatset temperature and residence time, another parameter that affects film shrinkage is toe-in. Toe-in is defined as the decrease in rail spacing in the tenter heatset zone measured relative to a maximum rail setting. For example, if maximum width of the film is 67 inches at the end of the stretch zone, and film width in the heatset zone is 65 inches, then the toe-in is 2 inches. The first rail in the heatset zone is preferably set between the maximum rail setting and the rest of the heatset zone rail settings to ensure a smooth transition. However, tenter rail configuration and tenter width may vary widely, and ideal rail settings must be determined experimentally in each case.

Toe-in affects the shrinkage in both in-plane directions, TD and MD. In addition, there are non-linear interactions between toe-in and heatset temperature for shrinkage properties. The measured shrinkage value is also a strong function of temperature and time used in the measurements. The non-linearity between the measured shrinkage values and heatset temperature and toe-in can be very different for different measurement conditions. In the present application, shrinkage properties are measured using a standard test condition of 150° C. for 15 minutes.

Again, the toe-in required depends on the materials in the film, on the intended application and on the heatset temperatures and residence times. Either one or the other or both heat set temperature and the toe-in may be varied to control the shrinkage in the film. For example, for a PEN based multilayer IR mirror film, a statistical model predicts that to get MD shrinkage of about 1% and TD shrinkage of about 2%, the tenter heat set temperature should be about 395° F. for about 10 seconds and the toe-in should be about ½ inch to about 1 inch from a maximum rail setting of about 70 inches.

To control shrinkage and provide a film suitable for wrinkle-free lamination to a non-planar substrate, the toe-in should be adjusted depending on the polymer used. For a PEN based multilayer IR mirror film, the toe-in should be about 0 to 1.5 inches, preferably about 0.5 to 1 inches at the preferred heatset temperature, film width and heatset zone residence times mentioned above. For a PET based multilayer IR mirror film, the toe-in should be about 0 to 2 inches, preferably about 0 to 1.5 inches at the preferred conditions described above.

The multilayer IR film may be coated with a primer to promote adhesion to the PVB. Coatings may change the shrinkage properties of a film. Typically, a primer coating may reduce TD shrinkage by about 0.2% to about 0.4% and increase MD shrinkage by about 0.1 to about 0.3%. The amount of change depends on the drying temperature of the coater oven, as well as on film tension and residence time in the heatset zone. So, if a multilayer IR film requires coatings prior to lamination, such as a primer and/or an UVA coating, the impact on film shrinkage properties due to the coating operation should be accounted for when designing the film process conditions to provide shrinkage properties.

Lamination Procedures

The multilayer IR mirror film described above may be laminated to a wide variety of non-planar substrates. Typical substrate materials include glazing materials such as glass, which may be insulated, tempered, laminated, annealed, or heat strengthened, and plastics, such as polycarbonates and polymethylmethacrylate (PMMA). The term non-planar substrate means a substrate with a continuous or compound curvature. A compound curvature means that the substrate curves in two different, non-linear directions from a single point. The curvature may be characterized by the degree of its non-planarity. For example, the aspect ratio of the width (w) of a raised or depressed area may be measured across an opening of the area to the depth (d) of the areas as measured from a major surface of the substrate. Alternatively, the non-planarity in the substrate may be measured in absolute terms. For example, the depth d of a raised or depressed area will preferably be measured from the geometric surface defined by the first major surface of the substrate and will typically be the largest depth from that geometric surface.

The multilayer IR mirror film of the invention is capable of conforming to a non-planar substrate during a nip roll lamination process without substantial cracking or creasing. Preferably, the non-planar substrate has a compound curvature. Substantially no cracking or creasing as used in this application means a lack of discontinuities in the smooth film surface that are detectable by the naked eye from a distance of less than about 1 meter, preferably less than about 0.5 meter.

The multilayer IR mirror film of the invention is heat set at a temperature sufficient to render the film capable of shrinking to conform without substantial wrinkling to a non-planar substrate. Preferably, the non-planar substrate has a compound curvature. Substantially no wrinkling as used in this application means a lack of small ridges or furrows resulting from contraction of the smooth film surface that are detectable by the naked eye from a distance of less than about 1 meter, preferably less than about 0.5 meter.

If the multilayer IR film is laminated into a vehicular safety glazing laminate, the laminated structure will be substantially wrinkle-free, preferably optically clear, to the naked eye from a distance of less than about 1 meter, preferably less than about 0.5 meter.

While not wishing to be bound by any theory, the lack of wrinkling in the multilayer IR film in a lamination process may be attributed to: 1) the differing moduli of the first, second and non-optical layers; 2) the amorphous nature of the second polymer layers; and 3) the multiple interfaces in the optical film stack. All of these characteristics of the film help dissipate energy, which results in favorable behavior in lamination and nip roll processes to non-planar substrates. In a preferred embodiment of the present invention, the film is used in non-planar laminated glass articles for vehicles.

To ensure a substantially wrinkle-free lamination of the multilayer IR mirror film in a non-planar glazing article for a vehicle, such as a safety glazing laminate, the heating/cooling procedures and conditions in the lamination process should be carefully controlled. The temperatures used depend on the Tg of the polymeric components of the film and the viscosity and adhesion level of the mechanical energy absorbing layers, such as PVB, polyurethane (PUR) and SURLYN™, to the film. The preferred mechanical energy-absorbing layer is PVB. Preferably, some level of adhesion should be established between the PVB, the film and the non-planar glazing sheet(s) before the film shrinks during the pre-heating and de-airing process. However, the PVB should preferably not become sufficiently soft to flow before the film shrinks. The PVB should tack the edges and hold the IR film in position while the film shrinks and forms to the shape of the laminate. The laminate should be cooled after autoclaving at a controlled rate to avoid possible wrinkling due to the recovery of thermal expansion of the IR film and possible delamination on the edges.

Figure 2A:
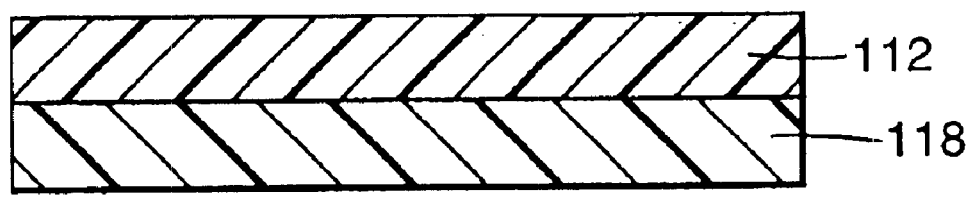
FIG. 2A is a cross-sectional view of a doublet pre-laminate structure that may be bonded to one or more glass sheets to make a vehicular safety glazing laminate.
Figure 2B:
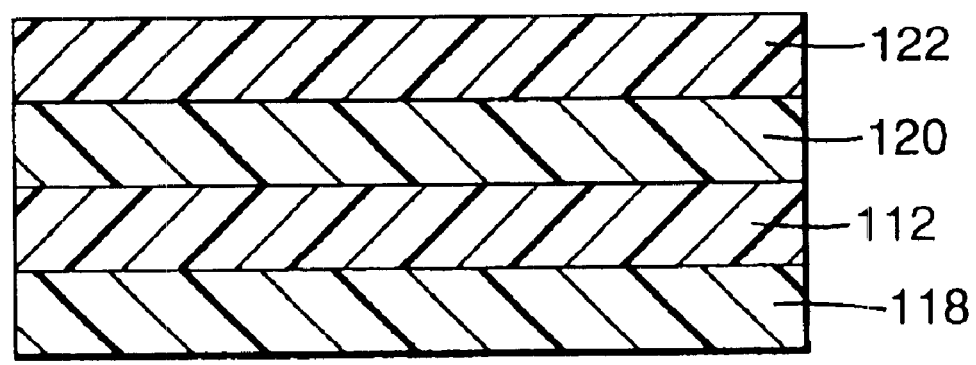
FIG. 2B is a cross-sectional view of a triplet pre-laminate structure that may be bonded to one or more glass sheets to make a vehicular safety glazing laminate.

Referring to FIG. 2A, a doublet pre-laminate structure 110 is shown that may be bonded to one or more planar or non-planar glazing sheets to make a vehicular safety glazing laminate. The pre-laminate 110 includes an infrared rejecting functional layer 112 made of the wrinkle resistant polymeric multilayer IR mirror film of the invention. The functional layer 112 may be bonded on at least one side to at least one layer 118 of a mechanical energy absorbing layer, preferably plasticized PVB, to form the doublet laminate 110. The functional layer 112 may be bonded as shown in FIG. 2B to a second layer 120 of PVB to form a triplet pre-laminate construction 140. One or the other or both of the PVB layers 118, 120 may include additional performance enhancing layers, such as, for example, a shade band layer 122 in the PVB layer 120.

Figure 3:
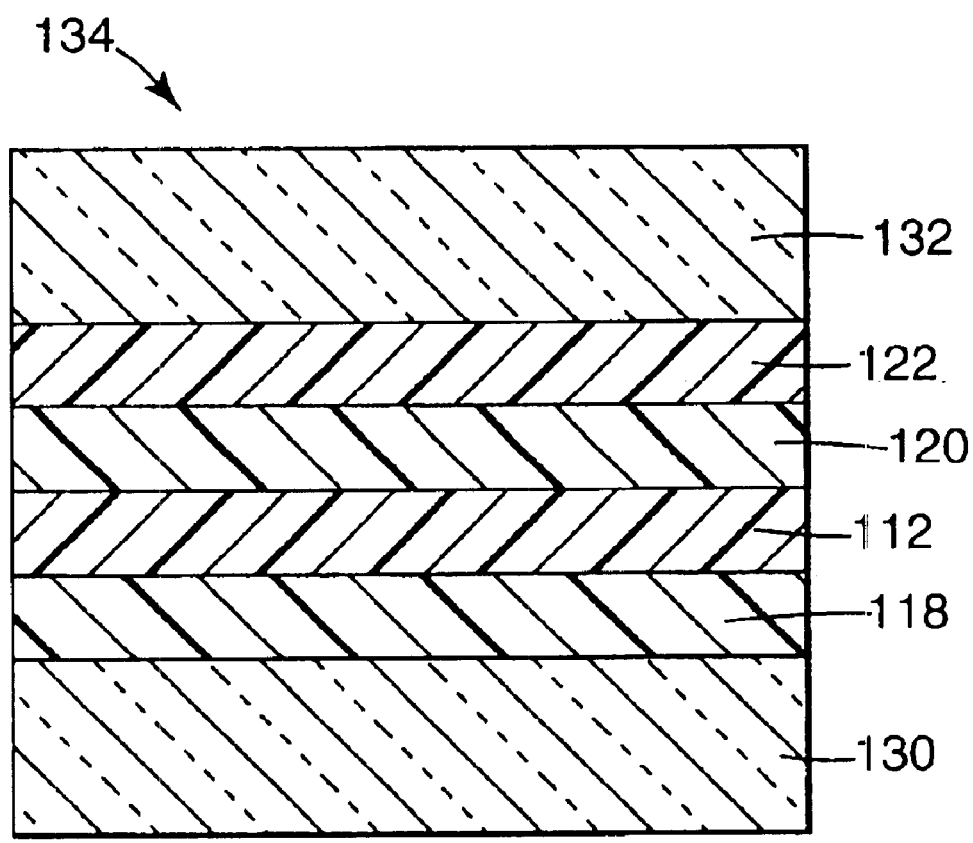
FIG. 3 is a cross-sectional view of a safety glazing laminate for a vehicle.

Referring to FIG. 3, once the pre-laminate structure 110 (FIG. 2A) or 140 (FIG. 2B) is formed, it may be matched with at least one, preferably two, planar or non-planar sheets of glazing material such as glass 130, 132 to form a safety glazing laminate 134.

To bond the PVB and IR film layers or the pre-laminate 110 or 140 to the glazing sheets 130, 132, the layers of PVB and IR film or the pre-laminate and the glazing sheets arm assembled by placing them atop one another to form a unitary laminate structure 134. The layers of the laminate 134 are then bonded together and air is removed from the construction. During this step it is preferable to heat the laminate construction in an oven to a temperature below the Tg of the dominant polymer in the IR film 112. This allows the PVB layers 118, 120 to build some adhesion with the film 112 or the glass 130, 132 while the film 112 shrinks to form to the shape of the laminate.

The laminate 134 may be bonded and de-aired by several different methods. One method uses a vacuum de-airing process in which a flexible band is placed around the edge of the laminate and connected to a vacuum system while the laminate is heated to generate a temporary bonding between the glass and PVB. Another method also uses a vacuum de-airing process where the laminate is put into a bag that is connected to a vacuum system. Yet another method uses a pressure roller device, referred to herein as a nip roller, which applies pressure to the laminate to de-air and to promote bonding between the layers.

Nip rolling devices for manufacturing vehicular safety glazings are well known, and a typical example is shown in U.S. Pat. No. 5,085,141. In general, a nip roll device is equipped with two series of pressing rollers: one series of lower rollers and one series of upper rollers. The laminate 134 is passed between the upper rollers and the lower rollers. The upper rollers and the lower rollers are pneumatically or otherwise forced against each other when the laminates pass between them, which removes air between the laminate layers and bonds the layers together. The positions of the rollers can be adjusted independently to obtain a curvature corresponding to the curvature of the glazing to be laminated. The two series of rollers are each mounted in a carriage that is rotatable within a support frame around a horizontal axis. By rotating the carriage as the laminates are processed, the rollers can be maintained perpendicular to the laminates to prevent breakage of the glass.

The laminate 134 may be bonded and de-aired in one nip roller or preferably passes through a series of nip rollers as the temperature of the laminate is gradually increased. As the temperature of the laminate 134 increases, the film 112 and the PVB layers 118, 120 begin to conform to the shape of the non-planar glass sheets 130, 132. The film 112 also shrinks and/or stretches locally to conform to the shape of the construction.

The laminate 134 is then heated in an autoclave to a maximum temperature of about 280° F. to about 300° F., depending on the viscosity characteristics of the PVB, to cause the PVB layers 118, 120 and the functional layer 112 to conform to the contours of the glass sheets 130, 132 and form an optical structure. The maximum pressure, typically greater than about 165 psi, should also be applied at this time. This allows the PVB to flow and/or spread to fill up voids, make a uniform sandwich construction, and bond the components of the laminates together firmly, while dissolving air in the PVB in a minimal time frame.

Although autoclave cycles can vary significantly, depending on the manufacturer, one (ho typical autoclave cycle involves: (1) increasing the temperature and pressure from ambient to about 200° F. and 80 psi within about 15 minutes; (2) increasing temperature to about 290° F. while holding the pressure at about 80 psi within about 40 minutes; (3) increasing the pressure to about 200 psi while holding the temperature at about 290° F. within about 10 minutes; (4) holding at the maximum temperature and pressure for about 20 minutes; (5) decreasing the temperature and the pressure to about 100° F. and 150 psi within about 15 minutes; (6) decreasing the pressure to ambient within about 4 minutes. The entire autoclave cycle is typically about 60 minutes to 120 minutes.

Preferably, the laminate 134 with IR film in the construction is cooled in a slow, controlled fashion, especially around the Tg of the dominant polymer in the film. This reduces wrinkling due to the recovery of the thermal expansion of the IR film and relaxes any stresses in the laminate construction. If the temperature is reduced too quickly during this cycle, the lateral force on the film or PVB may cause de-lamination, particularly on the edges of the laminate. The pressure should be maintained until the temperature is sufficiently lowered below the Tg of the dominant material in the film to make sure the structure established in the laminate is locked in. Preferably, the cooling occurs at an oven air temperature cooling rate of less than about 13° F. per minute, in the vicinity of the Tg of the dominant polymer in the film.

The present invention will now be described with reference to the following non-limiting examples.

EXAMPLES

Example 1

A 2 mil (0.005 cm) thick multilayer polymeric IR mirror film was prepared with 224 alternating microlayers of a first polymer of coPEN (90% PEN/10% PET) from 3M and a ad second polymer of PMMA CP 71 from Ineos Acrylics. The film also included coPEN skin layers on the exterior of the multilayer stack and PBL interior layers. The total thickness of the skins and PBL was about 37% of the total film construction. The film was oriented first in the MD direction in a length orienter with a stretch ratio of about 3.3:1 and then in the TD direction in a tenter with a stretch ratio of about 4.0:1. The temperatures in the tenter were: preheat zones 275° F.; stretch zones 280° F. and cooling zones 120° F. Residence time in the heatset zone was approximately 10 seconds. The heatset temperature and toe-in conditions were listed in Table 1 below, along with the shrinkage properties of the film.

The unprimed multilayer IR film samples were placed in glass/PVB/film/glass windshield laminates with compound curvatures. The DW 1224 windshield was intended for use in a model 1999 minivan manufactured by Daimler-Chrysler Corporation, Auburn Hills, Mich. and has dimensions of 43 inches (109 cm) by 60 inches (152 cm). The TD direction of the film corresponded to the height of the windshield. Lamination trials were conducted using a vacuum de-airing process. Each laminate was prepared in a clean room. The laminates were wrapped with Ace bandages and then placed in a plastic bag. Once the bag was sealed, the laminate was de-aired by placing the bag under a vacuum of about 25 inches Hg at room temperature for minimum of 15 minutes. The laminates were then heat tacked in an oven at 220° F. for about 45 minutes. After removal from the oven, the edges were sealed with a glycol ether sealant available from Dow Chemical, Midland, Mich. under the trade designation DOWANOL™, and the laminates were placed in an autoclave. The startup temperature of the autoclave was about 100° F., and within about 17 minutes, the temperature increased to about 275° F. and remained at that temperature for about 15 minutes. While the temperature was increasing, the pressure in the autoclave was also increased from room pressure to about 200 psi within about 19 minutes and remained at that level. After heat soaking was completed, the temperature was reduced to about 100° F. within about 10 to 15 minutes. At about the same time the pressure was also reduced to atmospheric pressure.

The lamination results are listed in Table 1.

TABLE 1

| Sample | Tenter heatset Temp (° F.) | Toe-in (inches) | Shrinkage (%) at 150° C. and 15 minutes | | Windshield Lamination Wrinkle Rating |
|---|---|---|---|---|---|
| | | | MD | TD | |
| #1-1 | 410 | 0 | 0.71 | 1.62 | Good |
| #1-2 | 410 | 2 | 0.69 | 0.50 | Medium |
| #1-3 | 460 | 2 | 0.20 | 0.03 | Poor |
| #1-4 | 440 | 2 | 0.46 | 0.42 | Medium |

The windshield lamination results in Table 1 demonstrate that the film samples made at a lower tenter heat set temperature, less than about 440° F., preferably about 410°

F. or less, increased shrinkage of the film and resulted in a laminate with fewer or no wrinkles. Wrinkle-fee lamination may be achieved when shrinkage is at least about 0.7% in both the MD and TD, preferably grater than about 1%.

Example 2

A multilayer IR mirror film with 224 microlayers was prepared. The layers alternated between a first polymer of coPEN (90%PEN/10%PET) from 3M and a second polymer of PMMA CP80 from Ineos Acrylics. The film also included coPEN skin layers on the exterior of the multilayer stack. The thickness of the skins and PBLs as a percentage of the total film construction prior to lamination is listed in Table 2. The film was orientated fir in the MD direction in a length orienter with a stretch ratio of about 3.3:1 and then in the TD direction in a tenter with a stretch ratio of about 4.0:1. The temperatures in the tenter were: preheat zones 275° F., stretch zones 280° F. and cooling zones 120° F. The residence time in the heatset zone was approximately 10 seconds. The heatset temperature and toe-in conditions are listed in Table 2 below, along with the shrinkage properties of the film samples. Selected, unprimed film samples from a designed experiment were laminated into a windshield (DW1218) intended for use in a 1999 Taurus automobile manufactured by Ford Motor Company, Dearborn, Mich. The windshield had compound curvatures and dimensions of 40 inches (102 cm) by 63 inches (160 cm). Samples were cleaned and prepared under standard production conditions. Two layers of 15 mil (0.038 cm) Dupont B14 PVB were used with IR film sandwiched in between and with one piece of glass on each outer side. After the entire construction was laminated and trimmed, a ring seal gasket was placed around the edge of the windshield and a vacuum was applied to the construction to remove air. While vacuum was applied, the laminate entered the warming oven for about eleven minutes at a temperature of about 212° F. After leaving the warming oven, the ring seal was removed and the samples were placed onto a holding rack.

The laminates on the rack then were placed into an autoclave. The temperature was increased from about 100° F. to about 290° F. within about 23 minutes from start, while the pressure was increased from atmospheric to about 165 psi within about 42 minutes. The temperature remained at 290° F. for about 34 minutes, and then was decreased gradually to about 90° F. in about 50 minutes and then further reduced to about 70° F. in about 8 minutes. The pressure remained at 165 psi for about 15 minutes, reduced gradually to 125 psi in about 50 minutes, and then further reduced to atmospheric pressure in about 8 minutes.

Table 2 below lists the samples tested, their properties and the lamination results.

The shrinkage of all the samples was greater than 0.8% in both in-plane directions, and the samples had no wrinkles in the laminated windshields. Increased shrinkage increases the edge pull-in, so shrinkage should be limited to reduce edge pull in and subsequent delamination and moisture penetration. The skin+PBL thickness within the tested range had little impact on shrinkage properties or lamination results. The shrinkage properties can be controlled for a variety of film thicknesses, resulting in improved lamination.

Example 3

A multilayer IR mirror film with 120 microlayers was prepared. The layers alternated between a first polymer of coPEN (90%PEN/10%PET) from 3M and a second polymer of PMMA CP80 from Ineos Acrylics. The film also included coPEN skin layers on the exterior of the multilayer stack. The thickness of the skins and PBLs as a percentage of the total film construction is listed in Table 3. The film was orientated first in the MD direction in a length orienter with a stretch ratio of about 3.3:1 and then in the TD direction in a tenter with a stretch ratio of about 4.0:1. The temperatures in the tenter were: preheat zones 275° F.; stretch zones 280° F. and cooling zones 120° F. The residence time in the heatset zone was approximately 10 seconds. The heatset temperature and toe-in conditions are listed in Table 3 below, along with the shrinkage properties of the film. The film samples were coated on both sides with a 4 wt % solution of gamma-aminopropyltrimethoxysilane primer.

Table 3 below lists the parameters of the film and PVB used in the laminates.

TABLE 2

| Sample ID | Tenter heatset temp (° F.) | Toe-in (in.) | Unprimed Film Shrinkage MD/TD (%) At 150° C./15 min. | Film thickness (mil) | Skin + PBL thickness (% of total film thickness) | Wrinkles in laminated windshields | Film pull-in on the edges of windshield MD (horizontal)/ TD (vertical) (mm) |
|---|---|---|---|---|---|---|---|
| #2-1 | 350 | 4 | 2.678/1.713 | 2.11 | 37 | No | 5–8/4–6 |
| #2-2 | 375 | 0 | 1.538/3.887 | 2.11 | 37 | No | 10/5–8 |
| #2-3 | 400 | 2 | 0.908/1.025 | 2.11 | 37 | No | 2–3/2–3 |
| #2-4 | 375 | 2 | 1.413/1.918 | 2.72 | 62 | No | 5–7/2–3 |
| #2-5 | 400 | 0 | 0.82/2.589 | 3.37 | 62 | No | 3–4/7–9 |

TABLE 3

| Sample ID | Heatset Temp (° F.) | Toe-in (in.) | Film Thickness (mil) | Skin + PBL thickness (%) | Unprimed Film % Shrinkage (MD/TD) | Primed Film % Shrinkage (MD/TD) | PVB |
|---|---|---|---|---|---|---|---|
| #3-1 | 400 | 1.5 | ~1.9 | 60 | 0.98/1.31 | 0.98/1.15 | 15 mil on each side |
| #3-2 | 380 | 1.5 | ~1.9 | 60 | 1.44/2.21 | 1.5/2.13 | 15 mil on each side |
| #3-3 | 420 | 1.5 | ~1.9 | 60 | 0.77/0.74 | 0.75/0.40 | 15 mil on each side |
| #3-4 | 400 | 1.5 | ~1.5 | 35 | 0.93/1.20 | 1.09/1.06 | 15 mil on each side |
| #3-5 | 400 | 1.5 | ~1.9 | 60 | 0.98/1.33 | 0.98/1.15 | 30 mil with shade band on each side |

The lamination trial was conducted using 1999 DW 1224 Chrysler minivan (NS) windshields with compound curvatures. A nip roll de-airing process was applied. The laminates were prepared in a clean room with controlled humidity and temperatures. The laminates were fed through an oven that was IR heated to about 135° F. for the glass surface temperature in about one minute and through the first set of nip rolls, then through a second oven that was also IR heated with glass surface temperature to about 210° F. in about 50 seconds and another set of nip rolls. The laminates were then placed on a rack and autoclaved using the following cycle. (1) increasing the temperature and pressure from ambient to about 200° F. and 80 psi within about 15 minutes; (2) continue to increase temperature to about 290° F. while holding the pressure at about 80 psi within about 40 minutes; (3) increase the pressure to about 200 psi while holding the temperature at about 290° F. within about 10 minutes; (4) holding at the maximum temperature and pressure for about 20 minutes; (5) decreasing the temperature and the pressure to about 100° F. and 150 psi within about 15 minutes; and (6) decreasing the pressure to room pressure within about 4 minutes.

The results are shown in Table 4.

TABLE 4

| Sample | Creasing | Orange peel | Wrinkles | Notes |
|---|---|---|---|---|
| #3-1 | No | No | No | Intermediate shrinkage |
| #3-2 | No | No | No | Higher shrinkage |
| #3-3 | No | No | Yes on left and right edges | Lower shrinkage |
| #3-4 | No | No | No | Intermediate shrinkage, thinner film |
| #3-5 | No | No | No | #3-1 film with thicker PVB |

All of the samples tested with different levels of shrinkage and thickness showed no creasing, cracking or orange peel problems. Most of the samples had no wrinkle problem, except one case where the film had lower shrinkage properties. The overall film thickness, the skin thickness and the PVB thickness within the tested ranges had no significant impact on the lamination results.

Example 4

A 1.6 mil (0.004 cm) thick multilayer polymeric IR mirror film was prepared with 576 alternating microlayers of a first polymer of 0.74 IV PET available from Eastman Chemical Company and a second polymer of coPMMA CP63 available from Ineos Acrylics Inc. The film also included skin layers of the same PET as used in the optical stack on exterior of the microlayer stack. The skin layer and PBL thickness was about 30% of the total film thickness. The optical stack was comprised with alternating layers of the first (A) and second (B) polymeric materials in which the six layer alternating repeat unit has relative optical thickness of about 0.778A, 0.111B, 0.111A, 0.778B, 0.111A, 0.111B. The film was stretched first in the MD direction in a length orientor with a stretch ratio of about 3.4:1. It was then stretched in the TD direction in a tenter with a stretch ratio of about 4.0:1. The tenter temperatures in the preheat, stretch, heatset and cooling zones were 210, 210, 450 and 100° F. respectively. The residence time in the heatset zone was approximately 10 seconds. The toe-in was about 1.5 inch (3.8 cm) from a maximum width of about 70 inches. The shrinkage of the film was 1.448% in MD and 2.883% in TD.

The unprimed multilayer IR film samples were then laminated into three 1999 DW 1224 Chrysler minivan (NS) windshields with compound curvatures. The laminates had the following layered construction: glass, 1:5 mil (0.04 cm) PVB (DuPont B14), multilayer IR film, 15 mil (0.04 cm) PVB, glass. The lamination was conducted using the same processes as in Example 1. All three laminates showed no wrinkles.

Example 5

A 2 mil (0.005 cm) thick multilayer IR mirror film with 224 microlayers was prepared. The layers alternated between a first polymer of 0.74 IV PET available from Eastman and a second polymer of coPMMA CP63 from Ineos Acrylics Inc. The film also included skin layers of the same PET in optics on the exterior of the multilayer stack. The thickness of the skin and PBL layers as a percentage of the total film construction was about 37%.

The film was oriented first in the MD direction in a length orienter with a stretch ratio of about 3.3:1 and then in the TD direction in a tenter with a stretch ratio of about 4.0:1. The temperatures in the tenter were: preheat zones 210° F.; stretch zones 210° F. and cooling zones 100° F. The residence time in the heatset zone was approximately 10 seconds.

The heatset temperature and toe-in conditions are listed in Table 5 below. The shrinkage properties of the film samples are also listed in Table 5. The film samples were coated on both sides with a 4 wt % solution of gamma-aminopropyltrimethoxysilane primer.

The multilayer IR film samples were then laminated into Chrysler minivan 1999 (DW1224) windshields with compound curvatures. The laminates are constructed of glass/15 mil (0.04 cm) PVB(DuPont B14)/multilayer IR film/15 mil PVB/glass. The lamination was conducted using the same processes as described in Example 2. The lamination results are also listed in Table 5.

TABLE 5

| Sample ID | Heat-set Temperature (° F.) | Toe-in (in.) (Tenter max. rails at 71.8 inch (182 cm)) | Unprimed Film % Shrinkage (MD/TD) | Primed Film % Shrinkage (MD/TD) | Wrinkles in laminated windshield | Pull-in in laminated windshield (inches) |
|---|---|---|---|---|---|---|
| 5-1 | 460 | 2 | 1.104/1.652 | 1.070/0.857 | Slight wrinkles on slides | 0 |
| 5-2 | 460 | 1 | 1.045/2.103 | 1.068/1.011 | Slight Wrinkles on Sides | 0 |
| 5-3 | 460 | 0 | 1.119/2.614 | 1.054/1.623 | No wrinkles | 0 |
| 5-4 | 450 | 0 | 1.273/3.083 | 1.286/1.86 | No wrinkles | 1/16 |
| 5-5 | 450 | 1 | 1.254/2.634 | 1.247/1.446 | No wrinkles | 1/32 |
| 5-6 | 450 | 2 | 1.263/1.899 | 1.300/1.022 | Slight wrinkles on sides | 0 |
| 5-7 | 440 | 2 | 1.580/2.182 | 1.490/1.379 | No wrinkles | 1/16 |
| 5-8 | 440 | 1 | 1.540/3.186 | 1.491/2.030 | No wrinkles | 1/8 |
| 5-9 | 440 | 0 | 1.668/3.511 | 1.573/2.318 | No wrinkles | 1.8 |

A number of embodiments of the invention have been described. Nevertheless, it will be understood that various modifications may be made without departing from the spirit and scope of the invention. Accordingly, other embodiments are within the scope of the following claims.

What is claimed is:

1. An article comprising a birefringent dielectric multilayer film sandwiched between two substrates, the film reflecting at least 50% of light in a band at least 100 nm wide in a wavelength region of interest, wherein the film is heat set at a temperature sufficient to render the film capable of shrinking so as to conform without substantial wrinkling when positioned between the two substrates and heated.

2. The article of claim 1, wherein the wavelength region of interest is from about 700 nm to about 2000 nm.

3. The article of claim 1, wherein the film is comprised of alternating layers of a first polymer and a second polymer.

4. The article of claim 3, wherein the first polymer is selected from the group consisting of PEN and coPEN, and the second polymer is selected from the group consisting of PMMA and co-PMMA.

5. The article of claim 3, wherein the first polymer is coPET and the second polymer is selected from the group consisting of PET and co-PMMA.

6. The article of claim 1 further comprising two layers of an energy absorbing material, with the birefringent dielectric multilayer film being sandwiched therebetween, wherein the two layers, the film and the two substrates are bonded together.

7. The article of claim 6, wherein the wavelength region of interest is from about 700 nm to about 2000 nm.

8. A laminate comprising the article of claim 6, wherein the two substrates are two non-planar substrates of a glazing material.

9. The article of claim 1, further comprising two layers of an energy absorbing material, with the birefringent dielectric multilayer film.

10. The article of claim 9, further comprising a shade band layer sandwiched between the substrates.

11. The vehicle of claim 10, wherein the article further comprises a shade band layer.

12. A laminate comprising the article of claim 9, wherein each layer of energy absorbing material, the birefringent dielectric multilayer film and the two substrates are bonded together, and the two substrates are two non-planar layers of a glazing material.

13. An article comprising a birefringent dielectric multilayer film sandwiched between two substrates, the film reflecting at least 50% of light in a band at least 100 nm wide in a wavelength region of interest, wherein the film is heat set at a temperature sufficient to enable the film to shrink up to 3.887% in an in-plane direction upon heating.

14. The article of claim 13, wherein the wavelength region of interest is from about 700 nm to about 2000 nm.

15. The article of claim 13, wherein the film is heat set at a temperature sufficient to enable the film to shrink at least about 0.7% in at least one in-plane direction upon heating.

16. The article of claim 13, wherein the film is heat set at a temperature sufficient to enable the film to shrink at least about 1.0% in at least one in-plane direction upon heating.

17. The article of claim 13, wherein the film has a first shrinkage in a first in-plane direction and a second shrinkage in a second in-plane direction, and the first direction is normal to the second direction.

18. The article of claim 13 further comprising two layers of an energy absorbing material, with the birefringent dielectric multilayer film being sandwiched therebetween.

19. The article of claim 18, wherein the wavelength region of interest is from about 700 nm to about 2000 nm.

20. The article of claim 18, wherein the two layers, the film and the two substrates are bonded together to form a glazing laminate.

21. The article of claim 13, wherein the film shrinks greater than about 0.4% and less than about 3% in both in-plane directions upon heating.

22. A substantially transparent laminate article comprising the following layers: a first non-planar layer of glass, a first layer of PVB, a film layer, a second layer of PVB and a second non-planar layer of glass, wherein the film layer comprises a birefringent dielectric multilayer film that reflects at least 50% of light in a band at least 100 nm wide positioned between wavelengths from about 700 nm to about 2000 nm, wherein the film is heat set at a temperature sufficient to render the film capable of shrinking to conform without substantial wrinkling to the non-planar glass layers.

23. The laminate article of claim 22, wherein the layers of glass have a compound curvature.

24. The laminate article of claim 22, wherein the article is a windshield for a vehicle.

25. A vehicle comprising a substantially transparent laminate glazing comprising the following layers: a first non-planar layer of glass, a first layer of PVB, a film layer, a second layer of PVB and a second non-planar layer of glass, wherein the film layer comprises a birefringent dielectric multilayer film that reflects at least 50% of light in a band at least 100 nm wide positioned between wavelengths from about 700 nm to about 2000 nm, wherein the film is heat set at a temperature sufficient to render the film capable of shrinking to conform without substantial wrinkling to the non-planar glass layers.

26. The vehicle of claim 25, wherein at least a portion of the first and second layers of glass has a compound curvature.

27. A substantially transparent laminate article comprising in the following order; a first non-planar substrate, a first layer of an energy absorbing material, a film layer, a second layer of an energy absorbing material, and a second non-planar substrate, wherein the film layer comprises a birefringent dielectric multilayer film that reflects at least 50% of light in a band al least 100 nm wide in a wavelength region of interest, wherein the film is heat set at a temperature sufficient to render the film capable of shrinking to conform without substantial wrinkling to the first and second non-planar substrates.

28. The laminate article of claim 27, wherein the wavelength region of interest is from about 700 nm to about 2000 nm.

29. A vehicle comprising an article of claim 27.

30. The vehicle of claim 29, wherein the wavelength region of interest is from about 700 nm to about 2000 nm.

31. A substantially transparent laminate article comprising in the following order: a first substrate, a first layer of an energy absorbing material, a film layer, a second layer of an energy absorbing material, and a second substrate, wherein the film layer comprises a birefringent dielectric multilayer film that reflects at least 50% of light in a band at least 100 nm wide in a wavelength region of interest, wherein the film is heat set at a temperature sufficient to render the film capable of shrinking up to 3.887% in an in-plane direction upon heating.

32. The laminate article of claim 31, wherein the wavelength region of interest is from about 700 nm to about 2000 nm.

33. The laminate article of claim 31, wherein the film shrinks greater than about 0.4% and less than about 3% in both in-plane directions upon heating.

34. A vehicle comprising an article of claim 31.

35. The vehicle of claim 34, wherein the wavelength region of interest is from about 700 nm to about 2000 nm.

36. The vehicle of claim 34, wherein the film shrinks greater than about 0.4% and less than about 3% in both in-plane directions upon heating.

37. A substantially transparent laminate article comprising in the following order: a first substrate, a film layer, and a second substrate, wherein the film layer comprises a birefringent dielectric multilayer film that reflects at least 50% of light in a band at least 100 nm wide in a wavelength region of interest, wherein the film is heat set at a temperature sufficient to render the film capable of shrinking to conform without substantial wrinkling to the first and second substrate.

38. The laminate article of claim 37, wherein the wavelength region of interest is from about 700 nm to about 2000 nm.

39. The laminate of claim 37, wherein the first substrate and the second substrate are non-planar.

40. A substantially transparent laminate article comprising the following layers: a first substrate, a film layer, and a second substrate, wherein the film layer comprises a birefringent dielectric multilayer film that reflects at least 50% of light in a band at least 100 nm wide in a wavelength region of interest wherein the film is heat set at a temperature sufficient to render the film capable of shrinking greater than about 0.4% in both in-plane directions upon heating and less than about 3% up to 3.55% in both an in-plane directions upon heating.

41. The laminate article of claim 40, wherein the wavelength region of interest is from about 700 nm to about 2000 nm.

42. The laminate article of claim 40, wherein the film shrinks greater than about 0.4% and less than about 3% in both in-plane directions upon heating.

43. The laminate of claim 40, wherein the first substrate and the second substrate are non-planar.

* * * * *

UNITED STATES PATENT AND TRADEMARK OFFICE
CERTIFICATE OF CORRECTION

PATENT NO. : 6,797,396 B1
DATED : September 28, 2004
INVENTOR(S) : Liu, Yaoqi J.

It is certified that error appears in the above-identified patent and that said Letters Patent is hereby corrected as shown below:

Column 1,
Line 33, after "such" delete "a" and insert -- as -- therefor.

Column 2,
Line 45, "$n_2$" should read -- $n_z$ --.
Line 63, "$n_{1z}$," should read -- $n_{1z}$ --.

Column 5,
Line 23, delete "," and insert -- ; -- therefor.

Column 6,
Line 34, "0.778A.111B.111A.778B111A.111B" should read -- .778A.111B.111A.778B.111A.111B --.

Column 7,
Line 7, "bas" should read -- has --.

Column 8,
Line 40, after "film-plane" insert -- indices --.

Column 10,
Line 3, "Naphthnalate" should read -- Naphthalate --.
Line 4, "(PEI)" should read -- (PET) --.
Line 58, "bas" should read -- has --.
Line 67, "Polymer" should read -- Polymers --.

Column 11,
Line 6, after "Tex." insert -- , --.

Column 12,
Line 12, "Young" should read -- Young's --.
Line 37, after "first" delete "in".

Column 14,
Line 17, "hexographic" should read -- flexographic --.

Column 15,
Line 15, "inventions" should read -- invention, --.
Line 53, after "equal" insert -- , --.

UNITED STATES PATENT AND TRADEMARK OFFICE
CERTIFICATE OF CORRECTION

PATENT NO. : 6,797,396 B1
DATED : September 28, 2004
INVENTOR(S) : Liu, Yaoqi J.

It is certified that error appears in the above-identified patent and that said Letters Patent is hereby corrected as shown below:

Column 16,
Line 30, after "mirror" insert -- film --.

Column 18,
Line 51, "arm" should read -- are --.

Column 19,
Line 40, after "one" delete "(ho".

Column 20,
Line 9, after "and a" delete "ad".
Line 24, "glass/PVB/film/glass" should read -- glass/PVB/film/PVB/glass --.
Line 27, after "Mich." insert -- , --.
Line 50, after "time" insert -- , --.

Column 21,
Line 2, "Wrinkle-fee" should read -- Wrinkle-free --.
Line 4, "grater" should read -- greater --.
Line 14, "fir" should read -- first --.
Line 36, after "entered" delete "the" and insert therefor -- a --.

Column 24,
Line 44, "1:5 mil" should read -- 15 mil --.

Column 27,
Line 9, after "order" delete ";" and insert therefor -- : --.
Line 14, "al least" should read -- at least --.

UNITED STATES PATENT AND TRADEMARK OFFICE
CERTIFICATE OF CORRECTION

PATENT NO. : 6,797,396 B1
DATED : September 28, 2004
INVENTOR(S) : Liu, Yaoqi J.

It is certified that error appears in the above-identified patent and that said Letters Patent is hereby corrected as shown below:

Column 28,
Line 26, after "interest" insert -- , --.
Line 29, after "3%" delete "up to 3.55%".
Line 29, after "both" delete "an".

Signed and Sealed this

Twenty-second Day of November, 2005

JON W. DUDAS
*Director of the United States Patent and Trademark Office*